United States Patent [19]

Johnson et al.

[11] Patent Number: 4,800,492

[45] Date of Patent: Jan. 24, 1989

[54] DATA LOGGER FOR A POST-MIX BEVERAGE DISPENSING SYSTEM

[75] Inventors: Donald A. Johnson, Duluth, Ga.; Dave Conklin, Corvalis, Oreg.

[73] Assignee: The Coca-Cola Company, Atlanta, Ga.

[21] Appl. No.: 49,221

[22] Filed: May 13, 1987

[51] Int. Cl.⁴ .................. G06F 15/24; B65B 3/04
[52] U.S. Cl. .................... 364/403; 222/23; 222/37; 222/71; 364/479
[58] Field of Search ............ 364/403, 478, 479, 510, 364/509; 340/606, 825.35; 73/861, 195, 198, 272 A; 377/21; 222/23, 30, 638, 640, 71, 37

[56] References Cited

U.S. PATENT DOCUMENTS

| | | | |
|---|---|---|---|
| 3,823,846 | 8/1971 | Probst | 222/70 |
| 4,107,777 | 6/1977 | Pearson et al. | 364/465 |
| 4,236,553 | 7/1979 | Reichenberger | 141/198 |
| 4,237,536 | 10/1978 | Enelow et al. | 364/465 |
| 4,247,899 | 1/1979 | Schiller et al. | 364/465 |
| 4,412,292 | 2/1981 | Sedam et al. | 364/479 |
| 4,487,333 | 2/1982 | Pounder et al. | 222/54 |
| 4,553,211 | 8/1983 | Kawasaki et al. | 364/479 |
| 4,562,547 | 3/1983 | Shauger | 364/484 |
| 4,572,253 | 7/1984 | Farmer et al. | 141/95 |

Primary Examiner—Jerry Smith
Assistant Examiner—Stephen M. Baker
Attorney, Agent, or Firm—Birch, Stewart, Kolasch & Birch

[57] ABSTRACT

A data logger for a post-mix beverage dispensing system in a fast food restaurant includes a data logger control box and drink counting software for operating a microprocessor coupled to the logger control box. The microprocessor can determine the number and size of drinks sold in the restaurant for selected periods during a day or days.

12 Claims, 2 Drawing Sheets

DATA LOGGER FOR A POST-MIX BEVERAGE DISPENSING SYSTEM

BACKGROUND OF THE INVENTION

The present invention relates to a data logger for a post-mix beverage dispensing system. More specifically, the present invention relates to a system for collecting data from soft drink dispensing equipment such as utilized in fast food restaurants, and a processing system for interpreting that data to estimate the number, size, and flavors of the drinks poured for specific times or intervals of time.

Inventory control and analysis with respect to post-mix drink dispensers is an important part of the management of fast food restaurants. Some attempts have been made heretofore in post-mix systems to automatically sense and store information such as drink size, flavor, and number of drinks. An example of such a system is described in U.S. Pat. No. 4,236,553 to Rechenberger.

The information obtained from the Rechenberger system is quite useful to a fast food restaurant manager for accounting purposes, and is also of interest to the beverage ingredient supplier. However, this information would be even more useful if it could be automatically correlated to a time of day, specific dates and specific periods of time within a given day or week. This time correlation would be useful in determining peak demand periods within normal business hours; and perhaps sales performances following special promotions or advertising by the ingredient supplier.

SUMMARY OF THE INVENTION

Accordingly, it is a primary object of the present invention to provide a data logging system for a post-mix drink dispenser which automatically correlates the number, size and flavor of drinks poured to specific periods of time within a given day or weak of a period of interest.

It is a further object of the present invention to provide a data logging system for a post-mix drink dispenser which may be easily connected to existing dispensing equipment and is compact enough to fit into spaces provided near or adjacent to the drink dispenser.

It is another object of the present invention to provide a data logging system for a drink dispenser having a sufficient memory capacity to log data for extended periods of time.

It is still another object of the present invention to provide a data logging system for a post-mix drink dispenser which is easily calibrated and set up by a serviceman at the point of sale locations.

These and other objects of the present invention are fulfilled by providing a beverage dispenser apparatus having a plurality of valve assemblies for dispensing respective flavors of beverages into containers of different sizes, a data logging system for sensing and storing information with respect to beverage dispensed from each respective valve assembly, the improvement comprising:

means for sensing the opening and closing of each valve assembly, a beverage dispensing cycle being initiated when a valve assembly is opoened and terminated when a valve assembly is closed, said means for sensing generating data signals indicating the opening and closing of each valve assembly;

clock means for continuously generating time of day signals;

means for receiving and storing said data signals and said time of day signals; and computer means for determining from the stored data and time of day signals, the volume of beverage dispensed for each respective valve assembly for a selected period during a day or days.

The computer means has software associated therewith which determines the number of containers filled to a predetermined level and the size of each container filled for each respective valve assembly for any selected period during a day or days.

Software is also provided to permit the calibration of the system before data logging begins. For example, the flavor for each respective valve assembly must be calibrated into the system so that the number of drinks poured or dispensed can be counted by flavor.

There are two main parts to the system of the present invention:

The Drink Logger box and drink counting software for an HP Portable Plus computer manufactured by Hewlett Packard. The Drink Logger box is a metal box the size of a small business suitcase which, in use, is wired to the dispensing equipment and collects data on an unattended basis for days or weeks at a time. This data is subsequently loaded to the HP Portable Plus computer where it is processed and interpreted by a set of specially written programs.

Further scope of applicability of the present invention will become apparent from the detailed description given hereinafter. However, it should be understood that the detailed description and specific examples, which indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
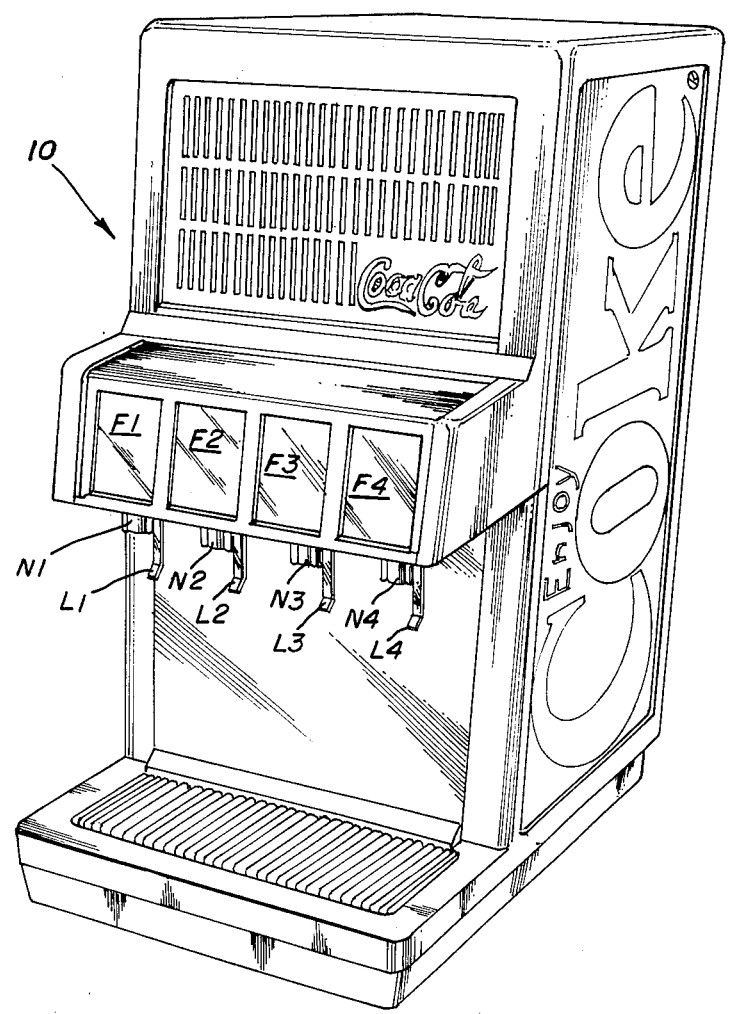
FIG. 1 is a perspective view illustrating an example of a post-mix beverage dispensing apparatus to which the data logging system of the present invention may be connected.

Referring to FIG. 1, there is illustrated a typical post-mix drink dispenser such as one that would be used in a fast food restaurant. The dispenser illustrated in FIG. 1 is generally indicated 10 and includes four valve assemblies for providing a mixture of flavor concentrate and carbonated water to dispensing nozzles N1 to N4. The dispenser illustrated in FIG. 1 is capable of dispensing four different flavors F1 to F4 in response to the selective actuation of one of the four levers L1 to L4. However, it should be understood that the dispenser may have any number of valve assemblies and associated nozzles and levers for dispensing more or less than four flavors of drinks. In fact, a typical beverage dispenser utilized in a fast food restaurant would have six valve assemblies for dispensing six associated flavors.

Figure 2:
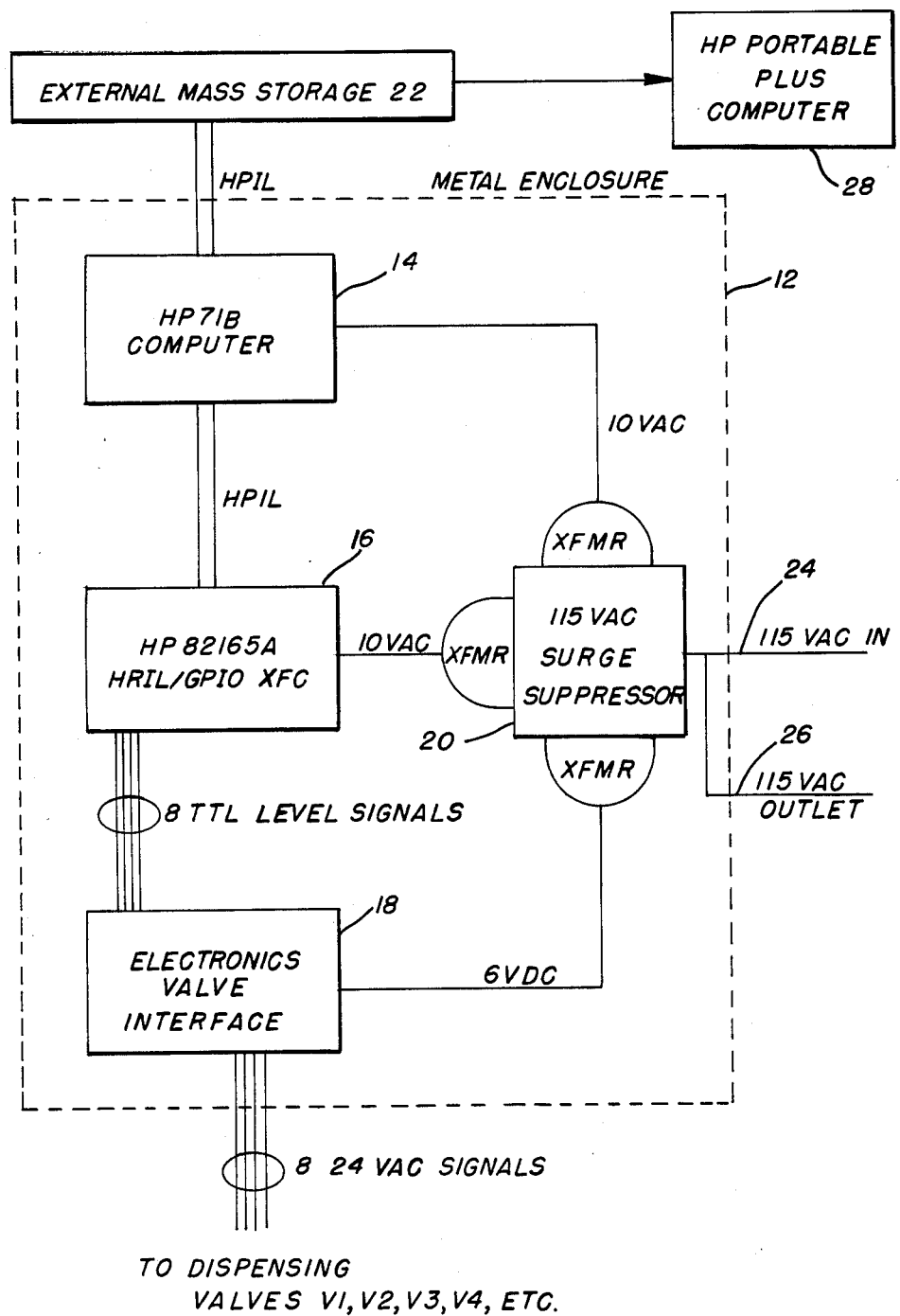
FIG. 2 is a block diagram of the components of the Data Logger box of the present invention which is connected to the dispensing valves of the dispenser of FIG. 1, the external mass storage and the portable data processor.

Referring to FIG. 2, there is illustrated a Drink Logger box 12 which may be a metal enclosure approximately 12"×12"×5" with a hinged lid. Box 12 contains an HP 71B computer 14 with several plug-in modules; an HP 82165A HP-IL/GPIO converter 16; an electronic interface 18 to dispensing valves V1, V2, V3, V4, etc.; and an AC power strip including an AC power inlet connection 24 and an auxiliary AC power outlet 26. The HP 71B computer 14 also has an output from the box 12 to an external mass storage device 22 to be described more fully hereinafter.

In use, the Drink Logger box is plugged into a 115 V AC outlet. The AC outlet box 26 is simply a convenience in case something else needs to be unplugged so that the Drink Logger could be plugged in. A wiring harness is installed into the dispenser of FIG. 1 such as in the region of the respective levers L1 to L4 to sense the movement of those levers, and thus the opening and closing, respectively, of the valve assemblies of the dispenser.

The HP 71B computer 14 in the box 12 is fitted with a 32K RAM plug-in module, 32K EPROM module, and an HP-IL module. The EPROM module contains a main program called LOGGER and several subroutines. The LOGGER program provides functions for calibrating the dispensing valves, monitoring the use of the valves and storing and unloading the collected data.

When the Drink Logger box is first installed on a particular dispensing machine, the installer runs through a calibration sequence in the LOGGER program which identifies the number of valves, the product which is dispensed from each valve, and the flow rate when the valve is open.

After the calibration, the Drink Logger is placed in a data collection mode. In this mode, it monitors the state of the valves and records each change of state and the time that it occurred, to a resolution of two tenths of a second. The raw data of valve state changes is stored in the RAM memory of the HP 71B computer 14. However, for extended periods of data collection, a mass storage device 22 is connected as illustrated to the Drink Logger box 12 via its HP-IL connector. Each night, for example at 3:00 A.M., the LOGGER program writes the raw data collected during the previous day to the mass storage medium 22.

The mass storage medium 22 is preferably a digital tape microcassette, on which the raw valve state change data is stored, and is subsequently read by software which runs on an HP Portable Plus computer. This computer is manufactured by the Hewlett Packard Company. The drink counting software consists of three programs written in Turbo Pascal and a Lotus 1-2-3 worksheet. The three Pascal programs are READLIF, CTDRINKS, and SUMMARY.

READLIF reads the files created by the Drink Logger box 12 and converts them into a format which is compatible with the MS-DOS operating system of the HP Portable Plus computer 28.

CTDRINKS processes and analyzes the raw data files. It creates a file composed of event records, where each event is the pouring of a drink. The event record identifies the size of the drink, the product dispensed, and the date and time of dispensing. CT DRINKS utilizes a parameter file containing information about the dispensing location from which the raw data was gathered; the standard drink sizes and so on.

SUMMARY summarizes the event file by counting the number of drinks of each size of a given flavor for specified intervals of time, either each quarter hour for a day, or each two-hour period for a week.

The LOTUS 1-2-3 spreadsheet creates a bar graph of the summary data prepared by the SUMMARY.

DESCRIPTION OF OPERATION

Setting Up and Starting a New Installation

After the cable extending from the electronics valve interface 18, which may be any type of suitable solid state switching circuit responsive to 24 VAC signals from the respective dispensing valves, which outputs TTL logic level signals to converter 16, AC power is connected to the system at input 24 and the installer is ready to begin the programming of the Logger box. The installer uses the keyboard and monitor of the HP 71 computer to calibrate or program the box.

If the program does not start automatically when the HP 71 computer 14 is turned on, the installer may type "Run Logger" and this will begin the program.

The current date will then be displayed. The installer may then change the date at this point.

The current time will be displayed. The installer may then change the time at this point.

The program will enter the calibration sequence. The details of the calibration sequence will be described in more detail hereinafter.

After calibration is completed, the user selects "Collect Data" from the main menu, and the program will begin the data collection process.

Main Menu For the HP-71

The main menu consists of the following prompt to the user:

CSDTFPRVMX?

The user may choose an option by pressing the appropriate letter if they are familiar with the menu. If the user needs more information about the menu choices, pressing the "down arrow" key will scroll through a list of prompts for each menu item. Pressing the "Y" key for the display prompt will select that item. The "up arrow" key will scroll up through the list of prompts.

The options from the main menu are:

C: Collect Data—continue the data collection process.

S: Shut Down—shut off the HP-71. User chooses to process data or not.

D: Set Date—set a new date as the computer date.

T: SetTime—set a new time as the current time.

F: Send File—send the file data to the PC.

P: Purge Data—purge the data files and prompt for recalibration.

R: Recalibrate—go through the complete calibration procedure.

V: View Calibration—review the calibrated flow rates.

M: Mass Storage Submenu—save files on mass storage or set a flag associated with saving on mass storage.

X: Exit to the HP-71 operating system.

Each of these main menu options will be briefly described hereinafter with cross-referencing to other menu options where appropriate.

Collect Data

This function is used to start the actual data collection process. The message "Collecting Data" will appear in the display of a HP-71 while it is collecting data. Also, the annunciator for flag 3 (at the right side of the HP-71 display) will flash on and off two to three times per second during data collection. Other annunciators may also flash on and off depending on the data itself and whether a DDFOT is attached to the Drink Logger.

To return to the main menu, the user can press the END LINE key. It may be necessary to hold the END LINE key down momentarily to get the attention of the HP-71.

S: Shut Down

This function is used to turn the HP-71 off before transporting the Drink Logger system. It should be answered by pressing the N key for "no".

D: Set Date

This function gives the user a chance to set the clock and calendar of the HP-71 to a new date.

T: Set Time

This function complements the D: Set Date function and is discussed more fully hereinafter.

F: Send File

The F function provides one of several ways of transferring data between the drink logger 12 and the HP Portable Plus computer 28. However, the Send File function only applies to data already processed in the HP 71 rather than to raw data needed to estimate drink counts. The Send File function is also quite slow. For these reasons, this function could be replaced with an enhancement which will send raw data to the HP Portable Plus computer 28 rather than process data.

P: Purge Data

This function, used to reclaim memory after a data file has been transferred to the HP Portable Plus 28, is discussed further hereinafter.

R: Recalibrate

Recalibration is necessary when installing the Drink Logger in a new location. The calibration process will be discussed in more detail hereinafter.

V: View Calibration Data

The View function provides a means for the user to review the current calibration data in the drink logger.

M: Mass Storage Submenu

When the Mass Storage function is selected, a short submenu "SRX" is displayed. As with the main menu, the "down arrow" key may be used to display short descriptive phrase for each option. The S option denotes "save files now and causes the HP-71 to attempt to write the data and calibration data files to an HPIL mass storage device connected to the external HPIL jack on the side of the Drink Logger box 12. The R option is used to tell the LOGGER program whether raw data, as well as processed data, should be saved to mass storage. The X option causes a return to the main menu. The user of the LOGGER program in conjunction with the mass storage medium 22 will be discussed further hereinafter.

X: Exit to System

This option returns the user to the operating system prompt on the HP-71. While it is unlikely to be used in normal operation, it is a handy escape during trouble shooting by development people.

Calibration Sequence

Prompt #1: A location prompt. If the system has been calibrated previously, the existing location is displayed. The user may select this by pressing END-LINE. If the location is not changed then the user is given an opportunity to recalibrate at the prompt "Calibrate Y/N?". If the reply is "N" than the calibration is skipped over. If the location was changed, then the program automatically goes through the remainder of the calibration sequence.

If there was no previous calibration then the location default is blank and the user is automatically required to go through the entire calibration sequence.

Prompt #3 on . . . For each valve the calibration requires the following information: drink name and flow rate of the valve. The drink name may be chosen from a menu of drink names, or, if the "Other" (Z) menu option is selected, the drink name may be typed in from the keyboard. After the drink name is entered, it is re-displayed with the valve number so that the user may confirm the correctness of the name.

For the flow rate, the program will prompt the user "#n Fill to line." The calibration volume is 400 ml (about 13.5 oz.) and a 400 ml plastic beaker with a line at the 400 ml level is the standard tool. Although the system will record the open time during several presses of the lever, it is more accurate to fill the cup in a single press. If the user overshoots the mark, he will be given an opportunity later to redo the calibration. After the cup is full to the line, the user presses the ENDLINE key on the keyboard.

After the flow rate is computer, it is displayed for confirmation by the user. If it is not correct, the user may choose to either enter the flow rate manually or to repeat the above cup-filling process for the calibration. Each time this is repeated the user will be asked to confirm the correctness.

At the end of the calibration sequence, the program will return to the main menu.

Setting the Date

The data currently in the HP-71 is displayed and the user is asked whether it is correct. If the answer is "N", the user is given an opportunity to change it, with the current date displayed as a default. If the user presses ENDLINE the program will keep the displayed default. The user may type in a new date, but it must be in the format of the default or else an error message will be displayed and the user will need to try again. The proper format is YY/MM/DD.

Setting the Time

The time currently in the HP-71 is displayed and the user is asked whether it is correct. If the answer is "N", the user is given an opportunity to change it, with the current time displayed as a default. If the user presses ENDLINE the program will keep the displayed default. The user may type in a new time, but it must be in the format of the default or else an error message will be displayed and the user will need to try again. The proper format is HH:MM:SS.

Transferring Data Files to the HP Portable Plus 28

There are several ways to transfer data from the Data Logger 12 to the HP Portable Plus 28. One way is to initiate the Send File command from the main menu of the HP71 LOGGER program. An alternate is to provide logic in the LOGGER program to enable saving data files onto HP-IL mass storage devices. This latter method, both because it is faster and because it allows for sasving the raw data necessary for estimating drink counts, is the preferred way to get the date across from the Drink Logger 12 to the Portable Plus 28.

A mass storage device 22 for preferred use with the Drink Logger is the HP 82151A Digital Cassette Drive, because of its small size and relative ruggedness. The HP 9114 Disc Drive or even the HP Portable Plus itself may be used as a mass storage device for the Drink Logger. Instructions in this section are written assuming the use of the cassette drive, but can be readily extrapolated by the user to cover the 9114 disc drive as well. Using the Portable Plus as an HP-IL mass storage device will be described hereinafter.

Whichever device is used, it should be connected with HP-IL cables to the HP-IL jack on the side of the Drink Logger 12. The cassette drive is turned ON and the cassette on which the data is to be recorded is placed in the drive. Either a brand new cassette or one that already has files on it may be used. In the case of a brand new unformatted medium, the LOGGER program will automatically format the medium before storing files on it.

The user may tell the HP71 LOGGER program to store its current data files by using the S command from the mass storage submenu. That is, one may select the M option from the LOGGER main menu, and then the S option fromthe submenu. The cassette should immediately start to turn.

Whenever the LOGGER program stores data files on a mass storage device, it writes at least two and optionally three files, for example:

| | |
|---|---|
| VARS031S | processed data file (PROCDAT) |
| INF0315 | calibration data file (LOCALINF) |
| RAW0315 | raw data file (RAWDIT) (optional) |

The name given in parentheses is the name of the corresponding file inside the HP71. The names given to the files as they are stored on the mass storage medium are composed of the date, type of file, and location:

| | |
|---|---|
| processed data file name | 1111mmdd |
| calibration data file name | INFmmdd |
| raw data file name | RAWmmdd | where
llll = first 4 characters of location
mm = month
dd = day

The raw data file is saved along with the processed data and calibration data files if the R option from the mass storage submenu has been previously used to tell the LOGGER program to save raw data. Whenever the LOGGER program is restarted with the RUN LOGGER command, the flag for saving raw data is cleared.

In addition to writing these files to mass storage on command of the user, the LOGGER program will also attempt to write the files to mass storage every night at 3:00 AM as part of the nightly operation of processing data. To make use of this automatic feature, it is only necssary to leave the cassette drive connected via HPIL to the Drink Logger 12 and turned on with a cassette in it. Since the cassette drive will be drawing power continuously in this configuration, it must be left connected to a recharger as well. The recharger may be plugged into the 110VAC outlet 26 on the side of the Drink Logger or into any other available outlet.

Each cassette or disc when used with the Drink Logger will hold 128K of data. The calibration data file is only 256 bytes long. The LOGGER program normally does not overwrite data files on cassettes, so when the cassette gets full, it can no longer store additional files. However, since the file names for a given location differ only by incorporating the data, if data is saved twice in one day the second set of files will overwrite the first set.

Restarting and Purging Data Files

The F command from the main menu may be used to explicitly purge the processed data and raw data files from the HP71's memory. It is appropriate to manually purge these files using the P command after storing the data on a cassette. When the LOGGER program is successful in storing the files to a cassette tape as part of its nightly processing cycle, it also automatically purges the files.

The P command purges the raw data file and the processed data file. It purges no other files. A safety "Are you SURE?"prompt protects from accidental erasure. After the data files are purged, the program gives the user an opportunity to recalibrate the system, just in case this site was not the original site. Pressing ENDLINE when the location is displayed and replying "N" to the "Calibrate Y/N?" prompt is all that is needed to bypass the calibration.

PRODUCING GRAPHS OF THE DATA ON THE HP PORTABLE PLUS

The current set of programs for the Protable Plus 28 uses the raw data collected by the Drink Logger 12 to estimate the number of drinks of each size as well as to calculate the actual volume of product dispensed. Once the raw data has been stored on a cassette, there are four steps to producing graphs of the drink counts and drink volumes on the Portable Plus 28:

1. Use the READLIF program to translate the RAWmmdd and INFmmdd files to MS-DOS format and read them into the Portable Plus 28.

2. Use the CTDRINKS program to process the raw data and produce an "event" file, containing one record for each recognizable drink or unrecognizable pour. The output of CTDRINKS is the file EVENT.PRN.

3. Use the SUMMARY program to summarize the events in the EVENT.PRN file on a daily or weekly basis. The output of the SUMMARY program is a file called SUMMARY.PRN.

4. Use the GRAPH worksheet to graph drink counts or volumes fromthe SUMMARY.PRN file produced by the SUMMARY program.

Using READLIF

READLIF is a program written in Turbo Pascal which runs as a command file from the MS-DOS prompt. The syntax for the READLIF command is similar to that for the COPY command:

READLIP <source> <destination> e.g.

READLIF C:RAW0304 A:

The example given would read the LIF file named RAW0304 from drive C:, translate it to MS-DOS format, and store it on drive A:.

Note that for the purpose of running CTDRINKS files must be processed in pairs composed of one raw data file and one calibration data file with the same data as the raw data file. To complete the previous example, the commands given would be:

READLIF C:RAW0304 A:

READLIF C:INF0304 A:

"LIF" stands for Logical Interface Format: it denotes a particular file format used by a number of HP computers but different from the MS-DOS format commonly in use on PCs.

Using CTDRINKS

CTDRINKS, like READLIF, is a Turbo Pascal command file. It has no command line parameters, so to get it running, just type

CTDRINKS at the MS-DOS prompt. Once it is running, it will ask you for the name of the raw data file to be analyzed. It assumes that the final four characters of the name you give it are a date, and reads the INF file with that date as well as the raw data file which you have named.

Once CTDRINKS begins processing the raw data, it may run for several minutes before producing any further output. It may be interrupted by hitting a key repeatedly. When interrupted in this way, it will ask Display, Print, Quiet, Abort, Ignore?

Pressing D for Display or P for Print will cause it to echo both the input raw data records and the output event records to the selected device. Pressing Q for quiet turns off the echo. I for Ignore starts CTDRINKS up again where it left off with no changes.

In the current version of the software, the raw data files which are used as input to CTDRINKS each contain data for only a single day. Thus each time CTDRINKS is run, it counts the drinks for a single day only. The output of CTDRINKS is a file named EVENT.PRN. In order to produce weekly graphs, it is necessary to run CTDRINKS once for each daily raw data file. After each execution of CTDRINKS, you must rename the resultinG EVENT.PRN file so that it is not overwritten by a subsequent execution of CTDRINKS, for example:

RENAME EVENT.PRN VARS0306.PRN

The algorithm which CTDRINKS uses to recognize a drink is as follows:

Drink sizes are defined by a nominal volume plus tolerances above and below the nominal volume. Tolerances are chosen so that drink volumes do not overlap from one drink size to the next.

A pour is treated as a topoff to the preceding pour of the same valve if it occurs within a fixed number of seconds of the previous pour and does not exceed a certain number of ounces. No drink is allowed to have more than a fixed number of topoffs.

Pours which are not recognized as part of a normal drink are accumulated in a drink category called ODD which is in addition to the normal S, M, L, AND XL sizes.

The actual values used for each of the parameters in the drink counting algorithm are stored in a Lotus worksheet called CTPARAMS This spreadsheet is printed to a file called CTPARAMS.PRN, which is read by CTDRINKS. Experiments with different values of the parameters may be made by changing the values in the CTPARAMS spreadsheet and regenerating the CTPARAMS.PRN file.

Using SUMMARY

Summary is also a Turbo Pascal command file like READLIF and CTDRINKS and, like CTDRINKS, it takes no command line parameters. To invoke SUMMARY, just type its name at the MS-DOS prompt:

SUMMARY

It will ask the user for the name for the EVENT file which he wishes to summarize: simply hitting the return key will cause the file name to default to EVENT.PRN. SUMMARY will also ask the user to indicate for which product the summary is to be prepared, whether it is to be a daily or weekly summary, and the starting date.

SUMMARY is similar to CTDRINKS in that it may take several minutes to do its work and it can be interrupted from the keyboard. When interrupted, SUMMARY asks Display, Quiet, Abort, Ignore?

If D for display is hit, SUMMARY will display each event record which it reads as input. The output from SUMMARY is placed in a file named SUMMARY.PRN.

When SUMMARY has finished summarizing the data from the first file, it will ask the user whether the user wishes to end the program, read and summarize the data from another file, or abort without overwriting any existing SUMMARY.prh FILE:

End, Read, or Abort?

The user presses the E, R, or A key to tell the program what he wants it to do. If you press R, the program will ask you to tell it the name of the next file to be summarized. A summary of an entire week's data may be compiled by inputting the names of the daily event files produced by CTdrinks from the raw data files for each day.

Using the GRAPH Worksheet

The final step in the process is to run Lotus 1-2-3 and retrieve a spreadsheet named GRAPH. GRAPH contains an autostart macro which asks the user for the name of the Summary file to load, and then asks whether the user wants to graph drink counts or drink volumes. The graphs are stacked bar graphs with very skinny bars: the bar types are hard to make out on the display of the Portable Plus, but may be more visible with plotted output produced by the Lotus utility Printgraph. the data from the summary file is stored in cells A1.N100 and may be inspected or printed with normal 1-2-3 commands.

Data File Formats

1. Localinf—This is the local file which contains the site's calibration information. Individual fields are separated by commas.

It contains the following information: Record #1:

Location name (and other information up to 80 characters)

Date of calibration

Number of valves.

Record #2-#7: For each valve in the system these records contain:

Valve #from left

Drink name

Bit position (The hardware bit associated with the valve. The least significant but is 1.)

Flow rate (The units are ounces/second.)

2. Rawdat—This is the raw data file in the HP-71 which is the direct product of the data logging process.

This data is reduced at the 3:00 A.M. time to produce the processed data in Procdat.

This file contains the following information:

The records are either a Start record, a State Change record, or an End record.

The Start record has the following format:

| Byte # | Description |
|---|---|
| 1-3 | Time, in 1/5 sec. units, packed in BCD with the sign bit set so that it appears as a negative integer when it is unpacked. |
| 4-11 | Date in ASCII YY/MM/DD format. |
| The State Change record has the following format: | |
| 1-3 | Time, in 1/5 sec. units, packed in BCD with the sign bit clear so that it appears as a positive integer when it is unpacked. |
| 4 | State of the input after the change |
| The End record has the following format: | |
| 1-3 | −600000, packed BCD |
| 4-6 | Time, in 1 sec. units, packed BCD. |
| 7-14 | Date in ASCII YY/MMdd FORMAT. |

Whenever the data collection process is interrupted an end record is written, and when the data collection routine is restarted a Start record is written. This may be caused by the processing of the date at 3:00 A.M., when a key is pressed to bring up the main menu, or when there have been problems with the HPIL loop to cause the program to reset the HPL4IL loop, a situation usually caused by a power failure.

3. Procdat—This is the processed data file in the HP-71. This is the file which is transferred to the PC. It contains the following information:

Records are either data records or time records. Time records have a special marker value in the first byte. FF hex. Record formats are:

Time record:

FF, YY/MM/DD string, HH:MM:SS string

The date and time here are the date and time of the beginning of data processing for this data set. There may be several days' worth of data in this file and each daily set has a time record as the first record. There may be additional time records if the collection process was interrupted.

Data record:

The number of bytes depends on the number of valves specified in the calibration process. If the number of active valves is N then:

| Byte # | Description |
|---|---|
| 1 to 2 | ounces for valve #1 |
| (2i−1)to(2i) | ounces for valve #i, i−2 to N−1 |
| (2N−1)to(2N) | ounces for valve #N |
| (2N+1)to(2N+2) | Time the motor was on, sec. |

The last two bytes are always the motor on time. For example: if there are 3 active valves, each data record will have 8 bytes.

4. SUMMARY.PRN—This is the file produced as output by the SUMMARY program on the Portable Plus. It is an MS-DOS file containing approximately 100 ASCII records, and is terminated with a CT1-Z. It is formatted as a PRN file for importing into Lotus 1-2-3. The first 4 lines are header information; the remaining lines are data records. Fields are separated by commas within each record. Fields may be either numeric or text; text fields are enclosed in quotations.

Record 1
  field 1: location of drink dispenser (text)
    This is usually the name of the restaurantfield 2: calibration date, in yy/mm/dd format
    This field is not enclosed in quotations, and is actually interpreted by Lotus as 3 separate numeric fields.
  field 3: number of valves Record 2
  field 1: type of summary (text)
    DAILY in this field indicates that there will be 96 data records each containing drink counts for a 15 minute period.
    WEEKLY here means that there will be 84 data records each containing drink counts for a two hour period.
  field 2: date of first day in summary period (text)
    The date here is in the yy/mm/dd format used in record 1, but is enclosed in quotes to make it a text item.
  field 3: starting time of the summary period (text)
    For the current DAILY and WEEKLY summary types, the starting time is always "00:00"
  field 4: valve number to which this data pertains
    1-6 for dispensing valves
    7 is a code for TOTAL OF ALL VALVES
    0 is a code for MOTOR
  field 5: product name to which this data pertains (text)
    e.g. Classic, Sprite, etc.
    Can also be "TOTAL OF ALL VALVES" or "MOTOR"

Record 3
  field 1: software version information (text)
    This field is a concatenation of the first line of the CTPARAMS file and the version string from the CTDRINKS program.

Record 4
This record contains field names for the data records which follow.
  field 1: "date"
  field 2: "time"
  field 3: "Sct"
  field 4: "Mct"
  field 5: "Lct"
  field 6: "XLct"
  field 7: "Svol"
  field 8: "Mvol"
  field 9: "Lvol"
  field 10: "XLvol"
  field 11: "TOTvol"
  field 12: "%ct"
  field 13: "ODDct"
  field 14: "ODDvol"

Records 5 to end of file
  field 1: data data, expressed as a day number since 1/1/1900
    This is the date representation used by Lotus.
  field 2: time in hrs of the beginning of this interval relative to the beginning of the summary period
  field 3: number of small drinks in this interval
  field 4: number of medium drinks
  field 5: number of large drinks
  field 6: number of extra large drinks
  field 7: volume in ounces of small drinks
  field 8: volume of medium drinks
  field 9: volume of large drinks
  field 10: volume of extra large drinks field 11: total volume, including odd-size pours field 12: percent of total volume contained in recognizable drinks field 13: number of odd-size pours unrecognizable as standard drinks field 14: volume of odd-size pours Using the HP Portable Plus as a DDFOT "DDFOT" is an acronym for "demo display, field output, and troubleshooting device. The DDFOT program is a Turbo Pascal program which runs on the HP Portable Plus, turning the Portable Plus into a sort of window onto the workings of the Drink Logger system. The Portable Plus may be connected to the Drink Logger system via HP-IL cables plugged into the side of the Drink Logger box 12 and into the back of the Portable Plus 28.

The DDFOT polls the Drink Logger several times a second, asking it for the status of the drink dispensing valves and the carbonator motor input. The status of the valves and motor is displayed across the top of the Portable Plus display. When a valve opens to dispense a drink, the DDFOT program computes the volume of product dispensed. A record of the last five dispensing events is displayed just below the valve status information. The bottom half of the Portable Plus display is devoted (in DDFOT version 1.01) to a dummy table of drink counts by size, product, and time of day; this table is suggestive of the type of information the drink logger is designed to gather. The drink count table does not represent actual measured data.

Using the DDFOT is quite simple:

1. Make sure the Drink Logger is collecting data (the display of the HP71 should say "Collecting Data . . .").

2. Connect the Portable Plus to the Drink Logger with HP-IL cables.

3. Run the DDFOT program on the Portable Plus. It can be selected from the PAM menu, or invoked from the MS-DOS prompt simply by typing

DDFOT

During its initialization process, the DDFOT program will display several messages. First it says "configuring the loop", meaning the HP-IL loop. When it finds the HP71 on the loop, it displays "hp71 is at loop address n". Next it reads and displays the status of the HP71. If the status of the HP71 is displayed as 0, this is an indication that the Drink Logger is not collecting data normally and needs attention.

The data collection loop inthe HP71 LOGGER program will return a status of 1 to the Portable Plus, whereupon the DDFOT program will display "asking HP71 for data now". After the HP71 sends over the calibration data, the DDFOT program clears the Portable Plus display and formats it to show valve status, the last 5 pours, and the dummy drink counts. Near the upper left corner of the Portable Plus display is the time of day, in hours, minutes, and seconds. The seconds will tick off in real time. Each time the Portable Plus interrupts the HP71 to ask it for data, annunciator 0 at the right edge of the HP71 display will be turned on. When the HP71 data collection loop sends the data to the Portable Plus, it turns annunciator 0 off again. In normal operation with the DDFOT the HP71 display will say "Collecting data and annunciator 3 also flashes on and off during data collection, whether or not the Portable Plus DDFOT is connected.

Like the Portable Plus CTDRINKS and SUMMARY programs, the DDFOT program may be interrupted by pressing a key. When so interrupted, a message is displayed:

Abort, Retry, or Ignore?

Pressing the A key at this juncture terminates the DDFOT program. Pressing the R key causes the DDFOT program to reinitialize itself and start over: all the information on the screen is lost. Pressing the I key causes the DDFOT program to resume execution without starting over: the informationon the screen is updated in the normal way.

The "Abort, Retry, or Ignore?"message may also be displayed in response to various errors detected by the DDFOT. The most common such error arises from problems with the HPIL cabling: it's easy to forget to plug in the HPIL cables, or to inadvertently dislodge a cable by moving the Portable Plus. Usually when an error is detected, the thing to do is to check that the cables are connected and firmly seated and then press the R key to tell the DDFOT program to start over.

Normal data collection time resolution of the HP71 LOGGER program without the DDFOT running is 200 milliseconds. When the DDFOT is attached, the additional loading on the HP71 causes the resolution to degrade to approximately 400 milliseconds.

Using the Portable Plus as a Mass Storage Device

Normally the HP82161A Digital Cassette Drive 22 would be used to record raw data files from the Drink Logger 12 and read them back in on the HP Portable Plus 28. The HP9114 disc drive may be used in the same way as the cassette drive. If neither of these two devices is available, it is also possible to configure the Portable Plus itself so that it appears as a mass storage device to the Drink Logger, using the Southern Software Link software package that has been provided as part of the Portable Plus software set. For a thorough understanding of all the capabilities of the Like software, one should refer to the Southern Software manual. The following, however, will provide simplified instructions for using the Portable Plus as a mass storage device for the Drink Logger.

1. Invoke the Link program on the Portable Plus by typing "LINK" at the MS-DOS prompt or by selecting Link from the PAM menu. Link will ask what device it should emulate; respond by pressing the D key ("Disc") for mass storage. The Link wil ask where to look for a file called HPILDISC; ordinarily you may just press RETURN to indicate that HPILDISC resides on the A: drive.

HPILDISC emulates the cassette tape in the cassette drive. All the files which the Drink Logger writes to mass storage will be stored within the HPILDISC file on the Portable Plus.

2. Connect the Portable Plus to the Drink Logger with HPIL cables.

3. Get back to the main menu of the LOGGER program on the HP71 (if the 71's display says "Collection Data", press the ENTER key).

4. Select the Mass storage submenu by pressing the M key on the HP71.

5. If you wish to write the raw data file out to the Portable Plus, press the R key and answer the "save raw data? Y/N" question by pressing the Y key. This only sets a flag; it doesn't actually write out the raw data. It is necessary to save the raw data in order to estimate drink counts with the CTDRINKS program on the Portable Plus.

6. Now you may use the "Save files now" command from the Mass storage submenu in the Drink Logger to write out the raw data file to the Portable Plus.

7. On the Portable Plus, press the Select key and then the E key to exit from the Link program. The data files from the Drink Logger are now contained within the HPILDISC file on the Portable Plus; these files are still in LIF format, rather than MS-DOS FORMAT. The foregoing explanation in section VIII of how to use READLIF to convert from LIF to MS-DOS format is generally applicable, but you have to know how to tell READLIF to look at the HPILDISC file. The appropriate invocation for READLIF in this situation has the form

READLIF A:/HPILDISC/RAW0304 A:

or synonymous expressions under MS-DOS. Even though HPILDISC is not regarded as a subdirectory name by MS-DOS, it is treated as such by READLIF.

Although the software for processing data from the Drink Logger 12 is described herein, the source code for both CTDRINK and SUMMARY are located in the patented file.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. In a beverage dispenser apparatus having a plurality of valve assemblies for dispensing respective flavors of beverages into containers of different sizes, a data logging system for sensing and storing information with respect to beverages dispensed from each respective valve assembly, the improvement comprising:
   (a) means for sensing the opening and closing of each valve assembly, a beverage dispensing cycle beng initiated when a valve assembly is opened and terminated when a valve assembly is closed, said means for sensing generating data signals indicating the opening and closing of each valve assembly;
   (b) controller means including,
      1. clock means for continuously generating time of day signals, and
      2. means for receiving and storing said data signals and said time of day signals; and
   (c) processor means for determining from the stored data and time of day signals, the volume of beverage dispensed for each respective valve assembly for a selected period during a day or days.

2. The apparatus of claim 1 further including:
   mass storage means coupled to said controller means, said mass storage means having a much larger storage capacity than the memory means of said controller means; and
   means responsive to a selected time of day signal for automatically transferring data from said memory means to said mass storage means.

3. The apparatus of claim 2 wherein said processor means processes data received from said mass storage means.

4. The apparatus of claim 1 wherein said processor means further determines the number of containers filled to approximately a predetermined level and the size of each container filled for each respective valve assembly for any selected period during a day or days.

5. The apparatus of claim 4 further including calibration means for generating information related to the flavor of beverage dispensed for each respective valve assembly, said processor means correlating flavor information with the number and size of containers filled.

6. The apparatus of claim 4 wherein the number of containers filled is determined by the processor means from the number of pours, a pour being defined by the closing of that valve assembly by a first predetermined time, subsequent pours for the same valve within a second predetermined time being defined as a topoff of the preceding pour.

7. The apparatus of claim 6 wherein said processor means interprets topoffs above a fixed number as separate pours, and said separated pours not including the closing of that valve assembly within said first predetermined time are stored as ODD pours.

8. For use in a beverage dispenser apparatus having a plurality of valve assemblies for dispensing respective flavors of beverages into containers of different sizes, a data logging method for sensing and storing information with respect to beverages dispensed from each respective valve assembly, the improvement comprising the steps of:
   (a) sensing the opening and closing of each valve assembly, a beverage dispensing cycle being initiated when a valve assembly is opened and terminated when a valve assembly is closed, said sensing generating data signals indicating the opening and closing of each valve assembly;
   (b) continuously generating time of day signals;
   (c) receiving and storing said data signals and said time of day signals; and
   (d) determining from the stored data and time of day signals, the volume of beverage dispensed for each respective valve assembly for a selected period during a day or days.

9. The method of claim 8 including the further step of determining the number of containers filled to approximately a predetermined level and the size of each container filled for each respective valve assembly for any selected period during a day or days.

10. The method of claim 9 including the further step of generating information related to the flavor of beverage dispensed for each respective valve assembly, and correlating flavor information with the number and size of containers filled.

11. The method of claim 9 wherein the number of containers filled is determined by the number of pours, a pour being defined by the opening of a given valve assembly followed by the closing of that valve assembly by a first predetermined time, subsequent pours for the same valve within a second predetermined time being defined as a topoff of the preceding pour.

12. The method of claim 11 including the further step of interpreting topoffs above a fixed number as separate pours, storing said separate pours not including the closing of that valve assembly within said first predetermined time as ODD pours.

* * * * *

UNITED STATES PATENT AND TRADEMARK OFFICE
CERTIFICATE OF CORRECTION

PATENT NO. : 4,800,492

DATED : January 24, 1989

INVENTOR(S) : Donald A. John and Dave Conklin

It is certified that error appears in the above-identified patent and that said Letters Patent is hereby corrected as shown below:

Claim 6, line 4 before "closing" insert --opening of a given valve assembly followed by the--.

Signed and Sealed this

Twenty-first Day of November, 1989

Attest:

JEFFREY M. SAMUELS

*Attesting Officer*     *Acting Commissioner of Patents and Trademarks*